United States Patent
Lee et al.

(10) Patent No.: US 8,200,274 B2
(45) Date of Patent: Jun. 12, 2012

(54) METHOD OF CONTROLLING POWER OF ACCESS UPLINK USING RELAY STATION AND SYSTEM THEREOF

(75) Inventors: Yong-Su Lee, Daejeon (KR); Jung-Hoon Oh, Daejeon (KR); Young-Il Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 509 days.

(21) Appl. No.: 12/513,273

(22) PCT Filed: Oct. 31, 2007

(86) PCT No.: PCT/KR2007/005475
§ 371 (c)(1),
(2), (4) Date: May 1, 2009

(87) PCT Pub. No.: WO2008/054150
PCT Pub. Date: May 8, 2008

(65) Prior Publication Data
US 2010/0069110 A1      Mar. 18, 2010

(30) Foreign Application Priority Data

Nov. 2, 2006 (KR) .................. 10-2006-0107670
Apr. 26, 2007 (KR) .................. 10-2007-0040971

(51) Int. Cl.
*H04B 7/00* (2006.01)

(52) U.S. Cl. ........ 455/528; 370/277; 370/315; 370/478; 370/435; 370/330; 455/500; 455/69; 455/562.1

(58) Field of Classification Search .......... 455/500–528, 455/69, 562.1; 370/330, 435, 478, 315, 277
See application file for complete search history.

(56) References Cited

U.S. PATENT DOCUMENTS

| | | | | |
|---|---|---|---|---|
| 6,014,374 A | * | 1/2000 | Paneth et al. | 370/345 |
| 7,853,202 B1 | * | 12/2010 | Visotsky et al. | 455/9 |
| 7,873,338 B2 | * | 1/2011 | Visotsky et al. | 455/226.2 |
| RE42,573 E | * | 7/2011 | Kim et al. | 455/452.2 |
| 2005/0014470 A1 | | 1/2005 | Malladi | |
| 2006/0135080 A1 | | 6/2006 | Khandekar et al. | |
| 2006/0154633 A1 | | 7/2006 | Wang | |
| 2008/0108369 A1 | * | 5/2008 | Visotsky et al. | 455/455 |
| 2010/0296475 A1 | * | 11/2010 | Visotsky et al. | 370/329 |

FOREIGN PATENT DOCUMENTS

KR      10-2005-0119176      12/2005

OTHER PUBLICATIONS

International Search Report for International Application No. PCT/KR2007/005475, mailed Feb. 12, 2008.

* cited by examiner

*Primary Examiner* — Lam T Mai
(74) *Attorney, Agent, or Firm* — Staas & Halsey LLP

(57) ABSTRACT

Provided are a method of controlling power of an access uplink using a relay station (RS) and a system thereof. When a base station (BS) decides that the subject of power control of the access uplink is itself, the BS generates a message for power control of the access uplink based on channel quality measurement information reported from the RS and transmits the power control message to a subscriber station (SS), and when the BS decides that the subject of power control of the access uplink is the RS, the RS generates a message for power control of the access uplink based on channel quality measurement information and transmits the power control message to the SS. Thus, fast power control of the access uplink can be performed.

20 Claims, 3 Drawing Sheets

METHOD OF CONTROLLING POWER OF ACCESS UPLINK USING RELAY STATION AND SYSTEM THEREOF

CROSS-REFERENCE TO RELATED PATENT APPLICATION

This application claims the benefit of Korean Patent Application No. 10-2006-0107670, filed on Nov. 2, 2006, and KPA No. 10-2007-40971, filed on Apr. 26, 2007, in the Korean Intellectual Property Office, the disclosures of which are incorporated herein by reference.

BACKGROUND OF THE INVENTION

1. Field of the Invention

The present invention relates to a method of controlling power of access uplink using a relay station and a system thereof.

This work was supported by the IT R&D program of MIC/ IITA [2006-S-011-01, Development of relay/mesh communication system for multi-hop WiBro].

2. Description of the Related Art

Recently, Institute of Electrical and Electronics Engineers (IEEE) 802.16 is progressing a standardization project of a multi-hop relay after IEEE 802.16-2004, which is a standard for fixed subscribers' terminals, and IEEE 802.16e-2005, which is a standard for providing mobility of subscriber station (SS), have been published. The purpose of the standardization project performed by IEEE 802.16 Task Group (TG) j is coverage extension and throughput enhancement.

According to the prior art, a multi-hop relay station has no role in closed-loop power control of terminals, and power control of SS using a multi-hop relay station is not disclosed.

SUMMARY OF THE INVENTION

The present invention provides a method of performing fast power control of an access uplink using a relay station and a system thereof.

According to an aspect of the present invention, there is provided a method of controlling power in a relay station (RS), the method comprising: measuring channel quality of an access uplink between a subscriber station (SS) and the RS and generating channel quality measurement information based on the measured channel quality; and reporting the channel quality measurement information to a base station (BS) or superordinate RS.

According to another aspect of the present invention, there is provided a relay station (RS) comprising: a quality measurement unit measuring channel quality of an access uplink between a subscriber station (SS) and the RS and generating channel quality measurement information based on the measured channel quality; and a quality reporting unit reporting the channel quality measurement information to a Base Station (BS) or superordinate RS.

According to another aspect of the present invention, there is provided a method of controlling power in a relay station (RS), the method comprising: measuring channel quality of an access uplink between a subscriber station (SS) and the RS; and generating a message for power control of the access uplink based on the measured channel quality and transmitting the power control message to the SS.

According to another aspect of the present invention, there is provided a relay station (RS) comprising: a quality measurement unit measuring channel quality of an access uplink between a subscriber station (SS) and the RS; and a power controller generating a message for power control of the access uplink based on the measured channel quality and transmitting the power control message to the SS.

According to another aspect of the present invention, there is provided a method of controlling power in a base station (BS), the method comprising: receiving channel quality measurement information of an access uplink between a subscriber station (SS) and a relay station (RS); and generating a message for power control of the access uplink based on the channel quality measurement information and transmitting the power control message to the SS.

According to another aspect of the present invention, there is provided a base station (BS) comprising: a channel information receiver receiving channel quality measurement information of an access uplink between a subscriber station (SS) and a relay station (RS); and a power controller generating a message for power control of the access uplink based on the channel quality measurement information and transmitting the power control message to the SS.

Thus, fast power control of an access uplink can be achieved.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will be described in detail by explaining preferred embodiments of the invention with reference to the attached drawings.

Figure 1:
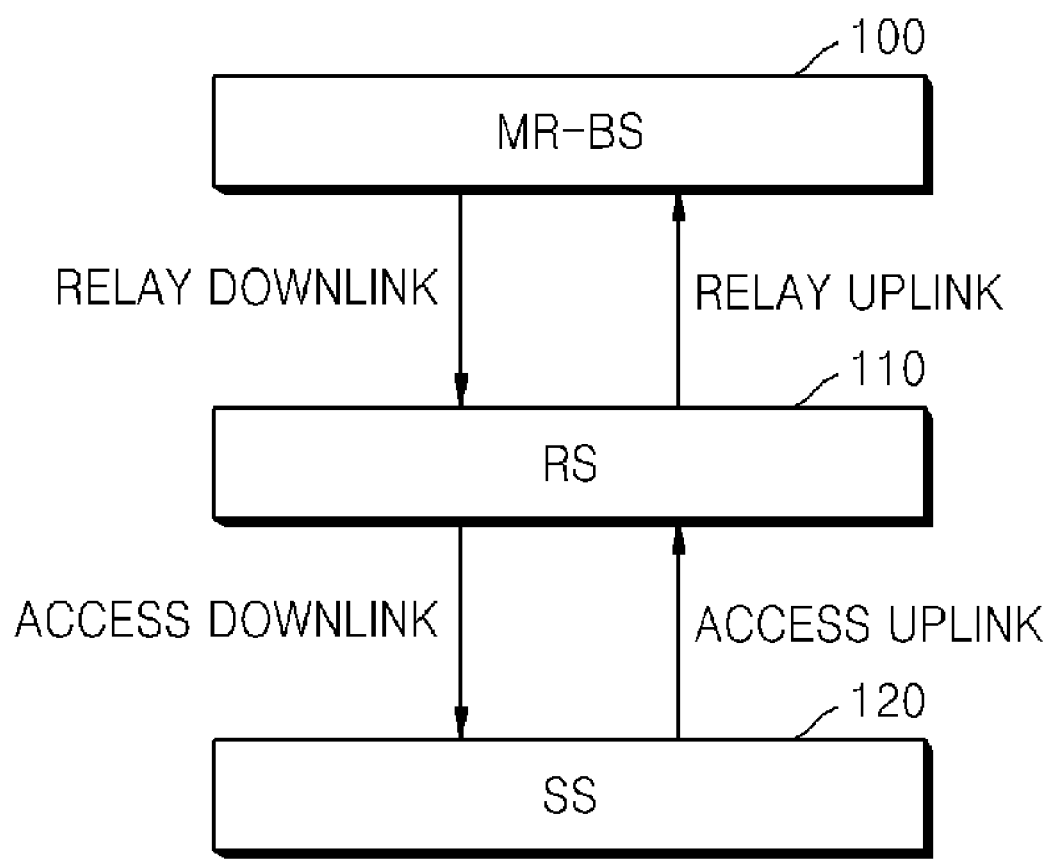
FIG. 1 illustrates links defined in a system in which a relay station exists according to an embodiment of the present invention.

FIG. 1 illustrates links defined in a system in which a relay station exists according to an embodiment of the present invention.

Referring to FIG. 1, in an Orthogonal Frequency Division Multiplexing (OFDM) system, a link between a multi-hop relay station (hereinafter, RS) 110 and a multi-hop relay (HR) Base Station (BS) (hereinafter, MR-BS) 100 is called a relay link, and a link between the RS 110 and a subscriber station (hereinafter, SS) 120 called an access link. According to upstream and downstream directions, the relay link is divided into a relay uplink and a relay downlink, and the access link is divided into an access uplink and an access downlink. The present invention particularly relates to the access uplink among the links. More than two RS can exist between the BS 100 and the SS 120.

Figure 2:
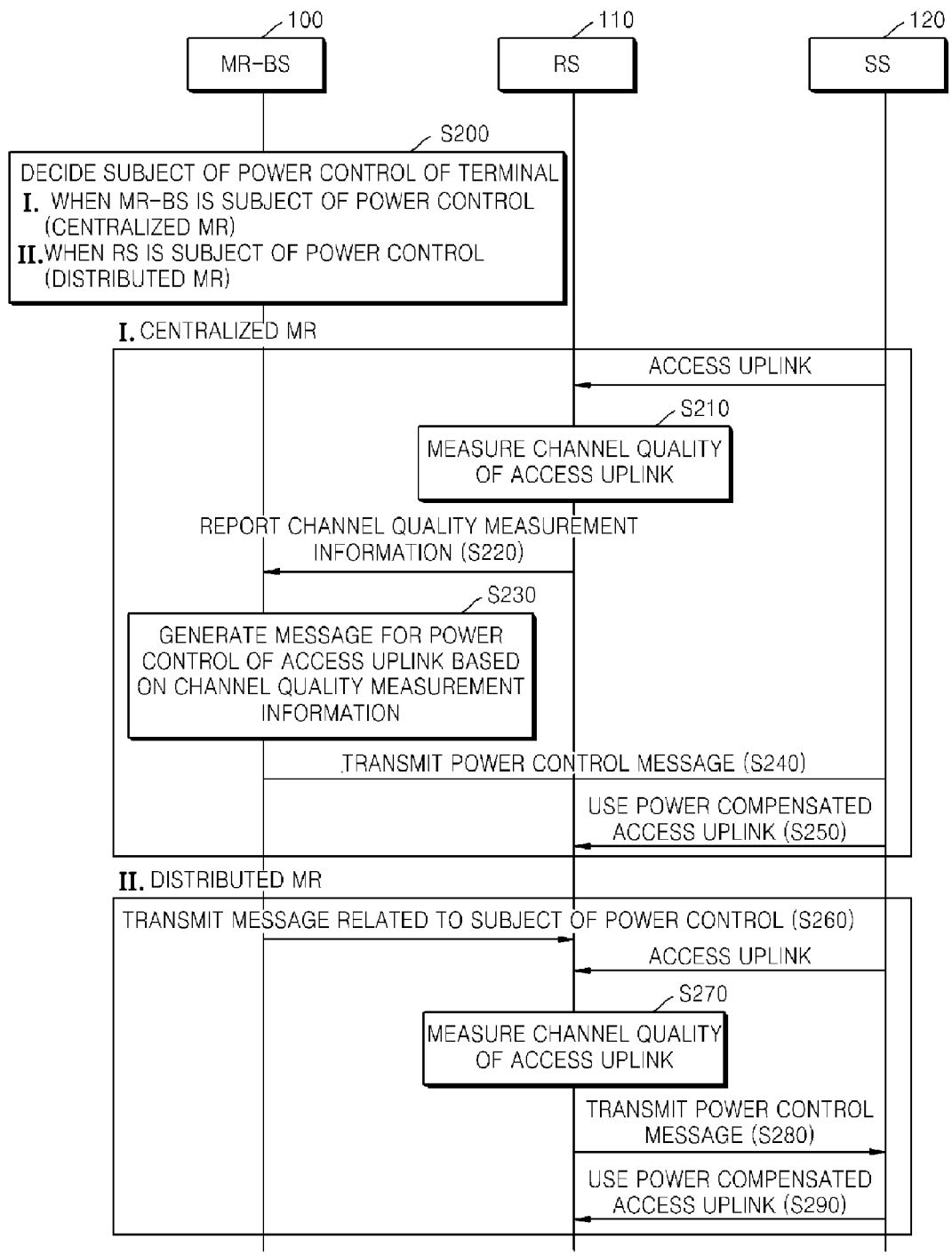
FIG. 2 is a signaling diagram of a method of controlling power of an access uplink using a relay station according to an embodiment of the present invention.

FIG. 2 is a signaling diagram of a method of controlling power of an access uplink using a relay station according to an embodiment of the present invention.

Referring to FIG. 2, the access uplink power control method is largely divided into a method of controlling power of the access uplink in the MR-BS 100 (method I: Centralized MR) and a method of controlling power of the access uplink in the RS 110 (method II: Distributed MR).

Only one of the method I and the method II can be implemented, if the method I and the method II are implemented together, the MR-BS 100 may select one of the method I and the method II.

A case where the method I and the method II are implemented together will now be described.

The MR-BS 100 selects one of the method I of directly controlling power of the access uplink and the method II of controlling power of the access uplink in the RS 110 by considering an entire power control situation of its cell in operation S200. The MR-BS 100 transmits the selected method to the RS 110 using a conventional or new message.

(1) Method I: Centralized MR

The RS 110 measures channel quality of an access uplink in operation S210. The RS 110 transmits a basic Connection Identifier (CID) and channel quality measurement information to the MR-BS 100 or superordinate RS in operation S220. In this case, the RS 110 can add the channel quality measurement information to a conventional message used between the RS 110 and the MR-BS 100 or generate a new message for reporting the channel quality measurement information, and transmit the message to the MR-BS 100. The channel quality measurement information includes reception power measurement information of the access uplink and a power compensation value calculated based on the reception power measurement information, and may further include various kinds of measurement information.

The MR-BS 100 measures reception power of the an relay uplink and generates a message for power control of the access uplink based on the channel quality measurement information reported from the RS 110 in operation S230, and transmits the power control message to the SS 120 via the RS 110 in operation S240. The power control message includes a power compensation value.

Meanwhile, for the message for power control of the access uplink, a SS specification may be maintained as it was by using a conventional power control message, e.g. a power control message defined in IEEE 802.16-2004 and IEEE 802.16-2005. The MR-BS 100 can perform power control considering the entire cell based on the channel quality measurement information reported from the RS 110.

The SS 120 immediately reflects the power compensation value included in the received power control message to a transmission power gain in operation S250. Thus, the power of the access uplink is controlled.

(2) Method II: Distributed MR

If the MR-BS 100 selects a method in which the RS 110 directly controls power of the access uplink in operation S200, the MR-BS 100 informs the RS 110 of the selected method in operation S260, and assigns only resources to a conventional power control message and transmits the power control message to the RS 110.

The RS 110 measures channel quality of the access uplink in operation S270 and transmits the power control message containing a power compensation value calculated based on the measurement result to the SS 120 in operation S280. That is, the RS 110 measures reception power of the access uplink, calculates the power compensation value based on the measurement result, inserts the calculated power compensation value into a power control message, and transmits the power control message to the SS 120. The SS 120 immediately reflects the power compensation value contained in the received power control message to a transmission power gain in operation S290. Thus, the RS 110 can directly control the power of the access uplink without intervention of the MR-BS 100.

Figure 3:
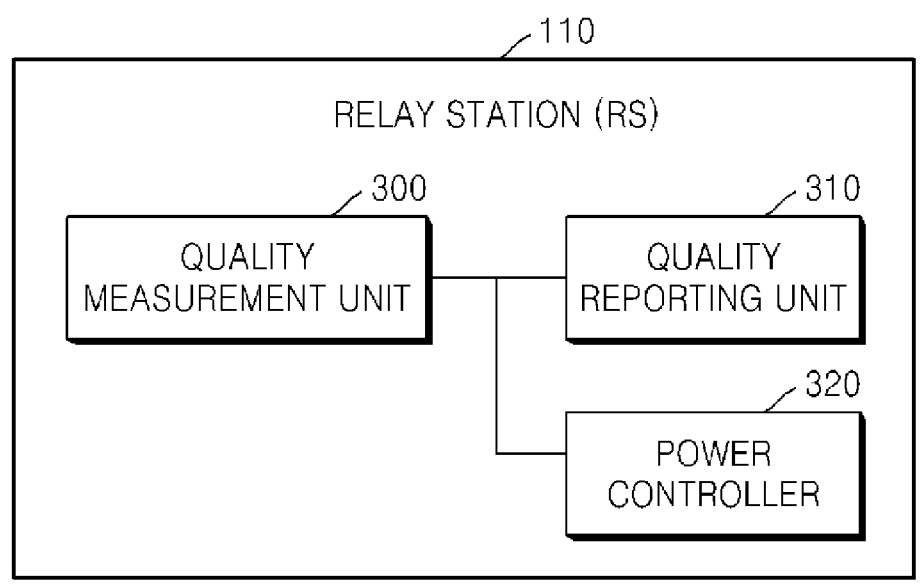
FIG. 3 is a block diagram of a relay station (RS) for controlling power of an access uplink according to an embodiment of the present invention.

FIG. 3 is a block diagram of the RS 110 for controlling power of an access uplink according to an embodiment of the present invention.

Referring to FIGS. 1 and 3, the RS 110 includes a quality measurement unit 300, a quality reporting unit 310, and a power controller 320.

The quality measurement unit 300 measures channel quality of the access uplink between the SS 120 and the RS 110 and generates channel quality measurement information based on the measured channel quality. In detail, the quality measurement unit 300 measures reception power of the access uplink and generates channel quality measurement information containing a power compensation value calculated based on the measured reception power.

The quality reporting unit 310 reports the channel quality measurement information generated by the quality measurement unit 300 to the MR-BS 100. That is, the quality reporting unit 310 reports the channel quality measurement information to the MR-BS 100 using a message conventionally or newly defined between the MR-BS 100 and the RS 110.

The power controller 320 generates a message for power control of the access uplink based on the channel quality measured by the quality measurement unit 300 and transmits the power control message to the SS 120. In the power control of the access uplink according to the current embodiment, since the subject of power control can be any of the MR-BS 100 and the RS 110 as illustrated in FIG. 2, if the RS 110 is selected as the subject of power control by the MR-BS 100, the power controller 320 directly performs the power control of the access uplink.

The message for power control of the access uplink transmitted from the power controller 320 to the SS 120 may be a conventional power control message applied to the SS 120.

Figure 4:
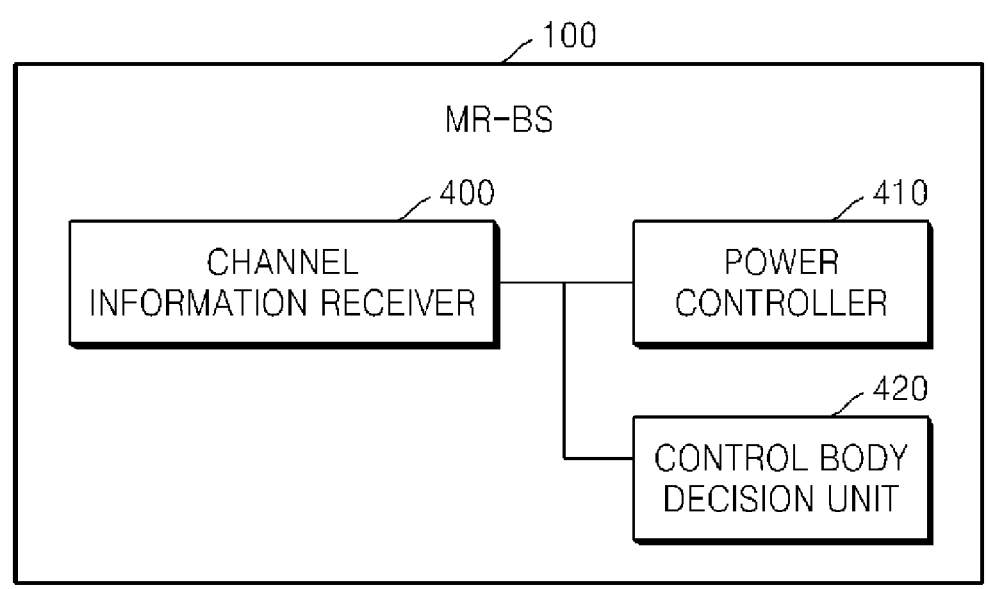
FIG. 4 is a block diagram of a Base Station (BS) for controlling power of an access uplink according to an embodiment of the present invention.

FIG. 4 is a block diagram of the MR-BS 100 for controlling power of an access uplink according to an embodiment of the present invention.

Referring to FIGS. 1 and 4, the MR-BS 100 includes a channel information receiver 400, a power controller 410, and a control body decision unit 420.

The channel information receiver 400 receives channel quality measurement information of an access uplink between the SS 120 and the relay 110. The control body decision unit 420 decides as described in FIG. 2 whether the subject of power control of the access uplink becomes the MR-BS 100 or the RS 110.

If the MR-BS 100 is decided as the subject of power control of the access uplink by the control body decision unit 420, the power controller 410 generates a message for power control of the access uplink based on the received channel quality measurement information and transmits the power control message to the SS 120 via the RS 110. In this case, the message for power control of the access uplink may be the conventional power control message applied to the SS 120.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the present invention, a RS can directly perform fast power control of an access uplink. In addition, when a MR-BS performs power control considering the entire cell, a power control value previously compensated by a RS is used, and thus, fast power control can be performed.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling power in a relay station (RS), the method comprising:
   measuring channel quality of an access uplink between a subscriber station (SS) and the RS and generating channel quality measurement information based on the measured channel quality; and
   reporting the channel quality measurement information to a base station (BS) or superordinate RS.

2. A method of controlling power in a relay station (RS), the method comprising:
   measuring channel quality of an access uplink between a subscriber station (SS) and the RS and generating channel quality measurement information based on the measured channel quality;
   reporting the channel quality measurement information to a base station (BS) or superordinate RS; and
   receiving from the BS a message for power control of the access uplink and transmitting the power control message to the SS.

3. The method of claim 2, further comprising the SS compensating power of the access uplink based on a power compensation value contained in the power control message.

4. A method of controlling power in a relay station (RS), the method comprising:
   measuring channel quality of an access uplink between a subscriber station (SS) and the RS and generating channel quality measurement information based on the measured channel quality; and
   reporting the channel quality measurement information to a base station (BS) or superordinate RS,
   wherein the generating of the channel quality measurement information comprises:
   measuring reception power of the access uplink; and
   generating the channel quality measurement information containing a power compensation value calculated based on the measured reception power.

5. A relay station (RS) comprising:
   a quality measurement unit measuring channel quality of an access uplink between a subscriber station (SS) and the RS and generating channel quality measurement information based on the measured channel quality; and
   a quality reporting unit reporting the channel quality measurement information to a Base Station (BS) or superordinate RS.

6. A relay station (RS) comprising:
   a quality measurement unit measuring channel quality of an access uplink between a subscriber station (SS) and the RS and generating channel quality measurement information based on the measured channel quality; and
   a quality reporting unit reporting the channel quality measurement information to a Base Station (BS) or superordinate RS,
   wherein the quality measurement unit measures reception power of the access uplink and generates the channel quality measurement information containing a power compensation value calculated based on the measured reception power.

7. A method of controlling power in a relay station (RS), the method comprising:
   measuring channel quality of an access uplink between a subscriber station (SS) and the RS; and
   generating a message for power control of the access uplink based on the measured channel quality and transmitting the power control message to the SS.

8. A method of controlling power in a relay station (RS), the method comprising:
   measuring channel quality of an access uplink between a subscriber station (SS) and the RS; and
   generating a message for power control of the access uplink based on the measured channel quality and transmitting the power control message to the SS,
   wherein the measuring of the channel quality comprises:
   measuring reception power of the access uplink; and
   generating channel quality measurement information containing a power compensation value calculated based on the measured reception power.

9. A method of controlling power in a relay station (RS), the method comprising:
   measuring channel quality of an access uplink between a subscriber station (SS) and the RS; and
   generating a message for power control of the access uplink based on the measured channel quality and transmitting the power control message to the SS,
   wherein the generating of the message for power control of the access uplink and the transmitting of the power control message to the SS are performed only when the RS is selected as the subject of power control by a base station (BS).

10. A relay station (RS) comprising:
    a quality measurement unit measuring channel quality of an access uplink between a subscriber station (SS) and the RS; and
    a power controller generating a message for power control of the access uplink based on the measured channel quality and transmitting the power control message to the SS.

11. A relay station (RS) comprising:
    a quality measurement unit measuring channel quality of an access uplink between a subscriber station (SS) and the RS; and
    a power controller generating a message for power control of the access uplink based on the measured channel quality and transmitting the power control message to the SS,
    wherein the quality measurement unit measures reception power of the access uplink and generates the channel quality measurement information containing a power compensation value calculated based on the measured reception power.

12. A relay station (RS) comprising:
    a quality measurement unit measuring channel quality of an access uplink between a subscriber station (SS) and the RS; and a power controller generating a message for power control of the access uplink based on the measured channel quality and transmitting the power control message to the SS, wherein if the RS is selected as the subject of power control by a base station (BS), the power controller generates a message for power control of the access uplink and transmits the power control message to the SS.

13. A method of controlling power in a base station (BS), the method comprising:

receiving channel quality measurement information of an access uplink between a subscriber station (SS) and a relay station (RS); and generating a message for power control of the access uplink based on the channel quality measurement information and transmitting the power control message to the SS.

14. A method of controlling power in a base station (BS), the method comprising:

receiving channel quality measurement information of an access uplink between a subscriber station (SS) and a relay station (RS); and generating a message for power control of the access uplink based on the channel quality measurement information and transmitting the power control message to the SS, wherein the transmitting comprises transmitting the power control message to the SS via the RS.

15. A method of controlling power in a base station (BS), the method comprising:

receiving channel quality measurement information of an access uplink between a subscriber station (SS) and a relay station (RS);

generating a message for power control of the access uplink based on the channel quality measurement information and transmitting the power control message to the SS; and selecting the RS as the subject of power control of the access uplink and transmitting the selection result to the RS.

16. A method of controlling power in a base station (BS), the method comprising:

receiving channel quality measurement information of an access uplink between a subscriber station (SS) and a relay station (RS); and generating a message for power control of the access uplink based on the channel quality measurement information and transmitting the power control message to the SS, wherein a SS compensating power of the access uplink based on a power compensation value contained in the power control message.

17. A base station (BS) comprising:

a channel information receiver receiving channel quality measurement information of an access uplink between a subscriber station (SS) and a relay station (RS); and a power controller generating a message for power control of the access uplink based on the channel quality measurement information and transmitting the power control message to the SS.

18. A base station (BS) comprising:

a channel information receiver receiving channel quality measurement information of an access uplink between a subscriber station (SS) and a relay station (RS); and a power controller generating a message for power control of the access uplink based on the channel quality measurement information and transmitting the power control message to the SS, wherein the message for power control of the access uplink is a conventionally used power control message applied to the SS.

19. A base station (BS) comprising:

a channel information receiver receiving channel quality measurement information of an access uplink between a subscriber station (SS) and a relay station (RS);

a power controller generating a message for power control of the access uplink based on the channel quality measurement information and transmitting the power control message to the SS; and a control body decision unit selecting the RS as the subject of power control of the access uplink and transmitting the selection result to the RS.

20. A non-transitory computer readable recording medium storing a computer readable program for executing the method of claim 1.

* * * * *